Figure 1:
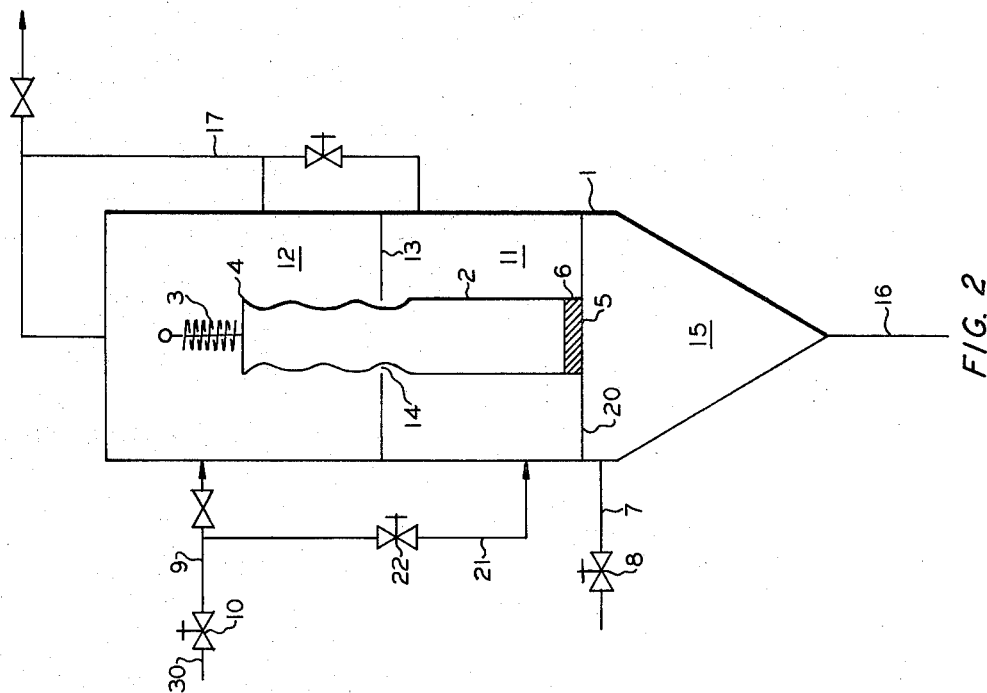

United States Patent [19]
Mills

[11] 3,803,807
[45] Apr. 16, 1974

[54] CARBON BLACK FILTRATION PROCESS AND APPARATUS
[75] Inventor: King L. Mills, Bartlesville, Okla.
[73] Assignee: Phillips Petroleum Company, Bartlesville, Okla.
[22] Filed: May 7, 1973
[21] Appl. No.: 357,641

[52] U.S. Cl............... 55/96, 55/291, 55/293, 55/302, 55/304
[51] Int. Cl............................................. B01d 46/04
[58] Field of Search......... 55/96, 97, 272, 273, 282, 55/283, 288, 291, 292, 293, 301, 302, 304, 305, 341, 361, 378; 423/460, 458, 459; 23/259.5

[56] References Cited
UNITED STATES PATENTS
| 1,508,367 | 9/1924 | Matlock | 423/458 |
|---|---|---|---|
| 1,509,912 | 9/1924 | Stebbins | 55/96 |
| 1,784,339 | 12/1930 | Clasen et al. | 55/302 |
| 2,792,907 | 5/1957 | Replogle | 55/291 X |
| 3,411,929 | 11/1968 | Garrett | 106/307 |
| 3,716,971 | 2/1973 | Reinauer | 55/341 X |

FOREIGN PATENTS OR APPLICATIONS
| 564,138 | 9/1944 | Great Britain | 55/293 |
|---|---|---|---|
| 700,782 | 12/1953 | Great Britain | 55/291 |
| 758,207 | 10/1956 | Great Britain | 55/291 |

OTHER PUBLICATIONS
"Ins and Outs of Gas Filter Bags", Chemical Engineering, McGraw Hill, New York, N.Y., October 19, 1970, pages 162–167.

Primary Examiner—Dennis E. Talbert, Jr.

[57] ABSTRACT

A carbon black process employing a compartmentalized housing, the lower portion of the bag being positioned in a lower compartment and the upper portion of the bag being positioned in the upper compartment. On carbon black removal from the bag, the black is removed first from the walls of the upper portion of the bag and thereafter from the walls of the lower portion of the bag.

8 Claims, 2 Drawing Figures

PATENTED APR 16 1974                                      3,803,807

CARBON BLACK FILTRATION PROCESS AND APPARATUS

This invention relates to a carbon black filtration process and apparatus.

In one of its more specific aspects, this invention relates to a bag filtration process and apparatus particularly suited for the filtration of carbon black in which embodiment it will be described without intending to limit the invention thereto.

The filtration of smoke comprising that combination of hot gases and carbon black for the recovery of the carbon black contained therein is well known. Such filtration processes frequently involve carbon black filter houses with bags positioned therein such as are described in U.S. Pat. Nos. 3,187,487 and 3,243,940, the disclosures of which are incorpoated herein by reference.

In these processes, the smoke is introduced into the inside of bags mounted in a housing. The gases pass through the walls of the bag and from the housing. The carbon black accumulates on the inner wall of the bags.

At chosen intervals, the filtration process is stopped and gas pressure is placed on the outside walls of the bags causing the bags to collapse from that shape taken during filtration. The collapsing of the bag tends to dislodge the carbon black from the inner walls of the bag. The dislodged black falls from the bag, through its lower opening and into a reservoir.

The collapsing of the bags to dislodge carbon black from their walls frequently does not take place uniformly progressively downwardly along the vertical axis of the bag. If the bag collapses near its outlet early in the dislodging cycle, further collapsing of the bag is hindered with the result that considerable black is retained on the inner walls of the bag. This retention seriously reduces the efficiency of the filtration.

The apparatus and method of this invention are directed towards the solution of this problem. According to this invention there is provided a bag filter housing which is divided into upper and lower filtration zones, an apertured plate forming the division. The bags are mounted in the housing and extend through the apertures in the plate in such a manner that about one-half of the bags extends above the plate and about one-half extends downwardly beneath the plate. A valved bypass conduit can connect the upper and lower zones.

During the filtration cycle, the incoming smoke enters the lower zone and passes into the inlet of the bag and up through the bag. The smoke expands the bag to establish a seal between each bag and the wall of the aperture through which it extends. Filtered gases are produced in both zones and the filtered gases from the lower zone can be passed through the bypass conduit into the upper zone or can be passed from the housing.

On the repressuring cycle to remove the black from the inner wall of the bags, the bypass between zones is closed and repressuring gas is introduced into the upper zone. The gas first collapses and dislodges the black from the inner walls of the bag which extends above the apertured plate into the upper zone. Because the portion of the bag in the lower zone remains open while the upper portion of the bag collapses, the carbon black dislodged from the upper walls of the bags falls unhindered through the lower portion of the bag and from the bag into the reservoir.

On continuing the repressuring of the upper portion of the bag, the seal between the bag and the apertured plate is gradually broken after the upper portion of the bags has had the carbon black dislodged therefrom. With the breaking of this seal, the repressuring gases begin to collapse the walls of the lower portion of the bags. The carbon black is dislodged from the inner walls of the lower portion of the bags and falls through the opening thereof. To further remove carbon black from the lower section of the bag, gas under pressure can be introduced only into the lower compartment to compress the walls of that portion of the bag positioned therein.

As a result of the practice of this invention, because a greater portion of the filtered black is removed from the bag, the initial pressure drop through the bags after the dislodging operation is reduced and the subsequent filtration cycle is of longer duration.

Figure 2:
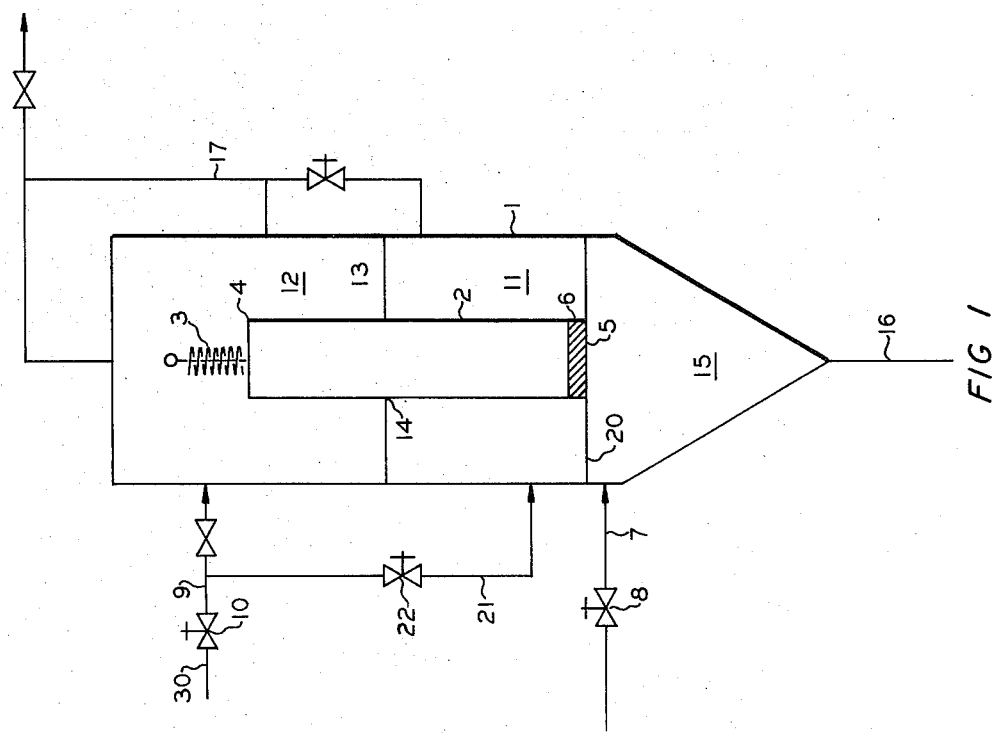

The invention will be more easily understood if explained in conjunction with the attached drawing in which FIG. 1 illustrates a view in elevation of a filter housing in which a single bag is depicted during the filtering cycle and FIG. 2 illustrates a view in elevation of the filter bag during the carbon black dislodging cycle.

Referring now to FIG. 1, there is shown housing 1 in which filter bag 2 is suspended by means of spring hanger 3, at its upper end 4, the filter bag being anchored and held open at its lower end 5 by ring 6 which encircles a chimney of a chimney plate positioned as compartmental floor 20.

The housing is adapted with smoke inlet conduit 7 having valve 8 positioned therein and with gas repressuring manifold 30 comprising conduit 9 having valve 10 positioned therein opening into upper section 12, and conduit 21 with valve 22 positioned therein opening into lower section 11. It is also adapted with filtered gas outlet manifold 17 by means of which filtered gas can pass from lower section 11 into upper section 12 or by means of which the filtered gases from both sections can be routed to disposal. The upper section 12 and lower section 11 are formed by plate 13 having an aperture 14 therein through which the bag extends. Carbon black which is dislodged from the bag accumulates in section 15 and is removed therefrom through conduit 16.

During the filtration cycle, with manifold 30 closed, smoke is admitted into section 15 through conduit 7. The smoke passes up into the filter bag through its lower end 5 and carbon black accumulates along the walls of the bag as filtration occurs. The pressure of the smoke within the bags forces the wall of the bag into sealing relationship with the wall of the aperture 14 of plate 13. Resultingly, there are formed the lower and upper filtration sections, the filtered gases being passed from the housing through outlet manifold 17.

Filtration is continued through both sections of the bag until carbon black accumulation on the inner wall of the bag increases the pressure drop through the bag to impractical limits. At this point, the filtration cycle is discontinued and the carbon black dislodging cycle is begun.

Referring now to FIG. 2, smoke introduction through conduit 7 and filtered gas disposal through manifold 17 is discontinued and repressuring gas introduction through manifold 30 is begun.

Gas is introduced through conduit 9 and exerts a pressure in the upper section 12 and on the outer walls of the section of the bag positioned therein to dislodge the carbon black accumulated on the inner walls of the bag. The dislodged black falls from the walls and down through the bag and into accumulator section 15 in an unimpeded manner since the walls of the bag in section 11 have not yet collapsed.

After a principle portion of the carbon black has been removed from the walls of that portion of the bag in the upper section, the walls of the bag proximate the apertured plate begin to be moved inwardly therefrom to break the seal between the bag and the wall of the aperture. As a result, the gas passes through aperture 14 and into contact with the lower section of the bag. The gas pressure is then applied to the lower section of the bag, either constantly or in a pulsating manner to dislodge the carbon black from the walls of the lower section of the bag. The carbon black so dislodged falls through the open end of the bag and into the accumulation section of the housing.

Should this procedure fail to satisfactorily remove the black from that section of the bag in lower compartment 11, gas introduction through conduit 9 into upper section 12 is discontinued and gas introduction into section 11 is made through conduit 21, this gas collapsing the bag in the lower section to dislodge the carbon black therefrom.

In the best mode of operating the filtration system here described, a smoke pressure of 10 to 14 inches of water will be employed during filtration. This will expand the bags against plate 13 sufficiently to provide a seal between the upper and lower compartments.

In the bag cleaning portion of the cycle, the repressuring gas is supplied at a gas rate about twice the gas rate employed during filtration.

As the bag in the upper compartment collapses at a pressure drop of about 6 to 8 inches of water, some of the gas will pass through aperture 14. The repressuring gas line into the bottom compartment can be thereupon opened to control the gas rate into the lower section. Since a large quantity of gas can be employed using conduit 21, the pressure in the lower compartment can be built up sufficiently to compress the bags therein.

To further facilitate the collapsing of the bags, the tension on spring hangers 3 can be reduced at the beginning of the repressuring cycle. This will result in a decrease in tension on the bag walls such that the walls will collapse more easily.

A typical filtration cycle is about 3 to 4 minutes, and a typical repressuring cycle is about 10 to 40 seconds. The invention can increase throughput on the filtration cycle by about 100 percent due to improved removal of filtered carbon black on the repressuring cycle.

It will be evident from the foregoing that various modifications can be made to the method of this invention. Such are considered, however, to be within the scope thereof.

What is claimed is:

1. A method of carbon black recovery from a gaseous stream which comprises:
   a. introducing said stream into a housing having a filter bag positioned therein and extending through an aperture of an apertured plate, said bag being positioned in sealing arrangement with the wall of said aperture to form an upper filter bag section and a lower filter bag section;
   b. passing the gases of said stream through said bag and from said housing to deposit carbon black on the inner wall of said filter bag;
   c. introducing repressuring gases into said housing to dislodge carbon black from the upper filter bag section and to move said bag from said sealing arrangement;
   d. introducing repressuring gases into said housing to dislodge carbon black from the lower filter bag section; and,
   e. recovering the dislodged carbon black.

2. The method of claim 1 in which said repressuring gases are introduced in step (d) through said aperture.

3. The method of claim 1 in which said repressuring gases are introduced pulsatingly.

4. The method of claim 1 in which said bag is positioned in tension during step (b) and said bag is in a relaxed position during steps (c) and (d).

5. A carbon black filtration apparatus comprising:
   a. a housing;
   b. an apertured plate positioned in said housing and dividing said housing into upper and lower compartments;
   c. conduit means for introducing smoke into said housing;
   d. conduit means for removing filtered gases from said housing;
   e. conduit means for introducing repressuring gases into said housing;
   f. conduit means for recovering carbon black from said housing; and,
   g. at least one filter bag positioned in the aperture of said plate and extending into said upper and said lower compartments.

6. The apparatus of claim 5 in which said filter bag is positionable in sealing arrangement to the wall of said aperture.

7. The apparatus of claim 5 in which said filter bag is supported in said upper compartment and is anchored in said lower compartment.

8. The apparatus of claim 7 in which said filter bag is anchored to a chimney plate.

* * * * *